May 6, 1924.
F. R. HARTSOCK
TIRE TOOL
Filed July 14, 1921
1,493,153
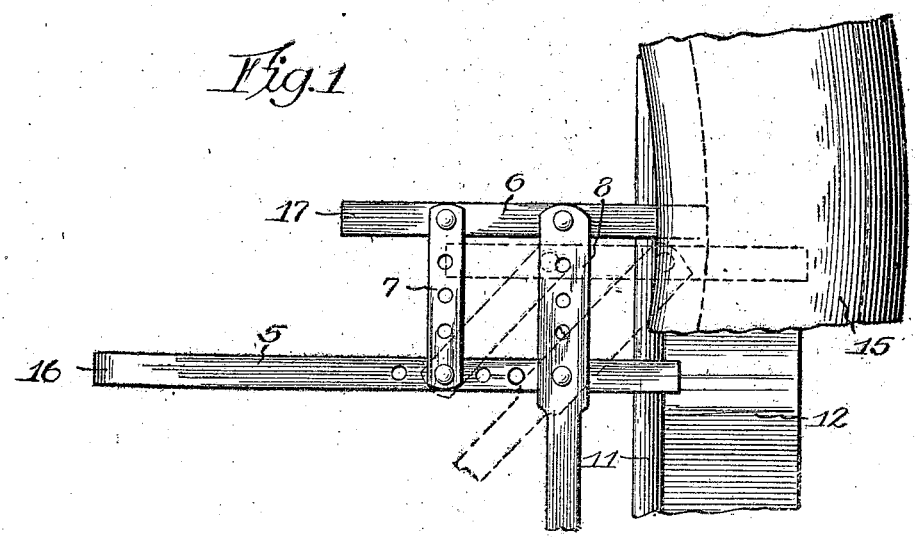
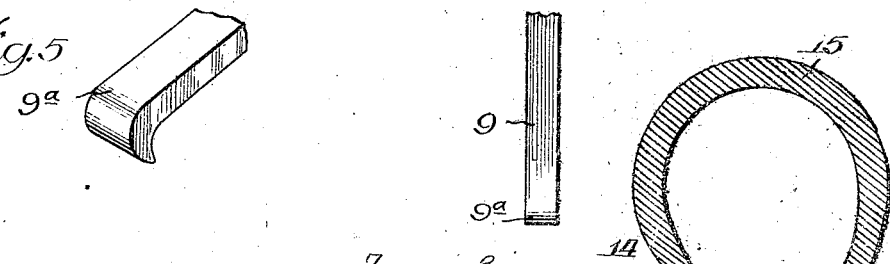
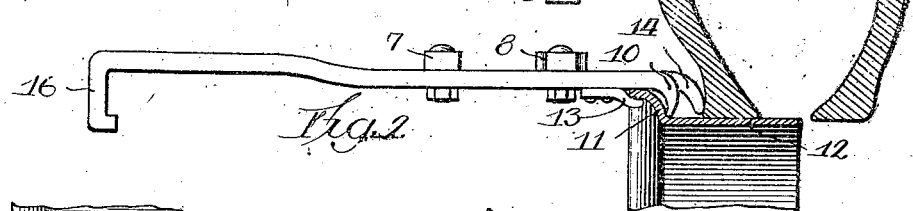
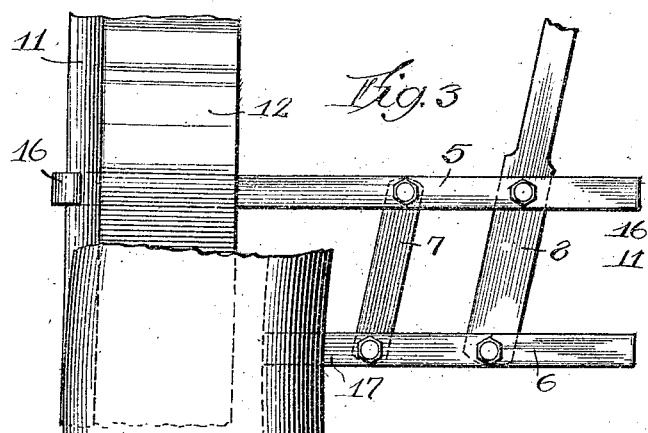
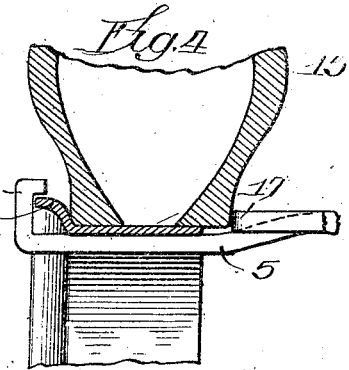
Witness.
Chas. R. Koursh.
Inventor,
Frank R. Hartsock,
By Bulkley & Dwenarton, Attys Patented May 6, 1924.

1,493,153

UNITED STATES PATENT OFFICE.

FRANK R. HARTSOCK, OF WARSAW, INDIANA, ASSIGNOR OF ONE-THIRD TO CHARLES O. DICKEY AND ONE-THIRD TO LEONARD E. DICKEY, BOTH OF WARSAW, INDIANA.

TIRE TOOL.

Application filed July 14, 1921. Serial No. 484,564.

*To all whom it may concern:*

Be it known that I, FRANK R. HARTSOCK, a citizen of the United States of America, and resident of Warsaw, Kosciusko County, Indiana, have invented a certain new and useful Improvement in Tire Tools, of which the following is a specification.

My invention relates to an improvement in tire tools,—that is, a tool for removing a tire from a wheel rim, the tool being also adapted for use in replacing a tire on the rim.

My invention is particularly adapted for use in connection with tires mounted upon a solid rim and held in place by a flange or ring on opposite sides of the rim, one of said flanges being removable so that the tire can be removed or replaced upon the rim by sliding the same transversely of the rim.

The features and objects of my invention will be more readily understood by having reference to the accompanying drawings in which I have illustrated one embodiment of my invention.

Figure 1 is a plan view showing the tool in position for removing the tire from the rim.

Fig. 2 is a transverse sectional view of the tool shown in Fig. 1.

Fig. 3 is a plan view showing the tool in position for replacing the tire on to the rim.

Fig. 4 is a partial sectional view of the tool shown in Fig. 3.

Fig. 5 is a detail of the end of the operating handle.

As illustrated, my tool consists of a pair of arms 5, 6, arranged in substantially parallel relationship and connected together by a link 7 pivoted to each of the arms. The bar 8 is likewise pivoted to each of the arms and is extended beyond the bar 5 so as to form an operating handle 9, the end of this handle being curved downward and provided with a flattened end portion 9ª, as shown in Fig. 5. The use of the link 7 maintains the parallel relationship between the bars 5 and 6 at all times. The bar 5 terminates at one end in a hook-shaped portion 10 which is adapted to engage with the permanent ring or flange 11 of the rim 12. A holding finger 13 is secured to the lower surface of the arm 5 and engages beneath the flange of the rim, as clearly shown in Fig. 2, so that the arm 5 firmly grips the rim flange. The corresponding end of the arm 6 is provided with a downwardly curved nose 14 which is adapted to press against the bead of the tire. The opposite end of the arm 5 is provided with a hooked end 16 for engaging the rim flange when replacing a tire on the rim, as hereinafter pointed out, while the opposite end of the arm 6 is provided with a tire engaging end 17.

In order to remove the tire 15 from the rim 12, the outside or removable ring or flange is first removed in the usual manner, and then the end 10 of the puller-arm 5 of the tool forced between the bead of the tire and the fixed or permanent flange 11, the finger 13 engaging beneath the flange so that the tool firmly grips the rim. If necessary, the flattened and somewhat sharpened end 9ª of the handle 9 can be employed to force the tire from the rim flange sufficiently to permit the insertion of the hooked end 10 of the arm 5. The nose 14 of the arm 6 is then forced against the bead of the tire by pulling upon the operating handle 9 which, due to the double pivoted arrangement of the various links moves in a direct line owing to its parallel connections and thus prevents slipping or tilting and gradually forces the same off the rim.

The nose 14 of the pusher-arm 6 is so shaped that it engages the tire at a point adjacent to the rim and in its movement is advanced close to the rim and thus applies pressure at the point where the tire is most firmly held. In tires of this construction they often become rusted on the rim in such a manner that considerable force is required to force them off the rim. By having the nose 14 engage the bead of the tire adjacent to the rim, not only do I prevent damage to the tire, but I also apply the force at the point where it is most effective.

In order that the tool may be employed for replacing the tire on the rim, the hooked end 16 of the puller-arm 5 is projected underneath the rim and between the spokes so as to hook over the fixed or permanent flange, as clearly shown in Figs. 3 and 4. Then through the operation of the operating handle 9 the abutting end 17 of the pusher-arm 6 is pressed against the beads of the tire so as to force the tire on to the rim, as clearly indicated in Figs. 3 and 4.

To provide for suitable adjustment for varying operating conditions, a series of holes may be provided in each arm and link so that they may be connected together in varying relationship—that is, the length of the connecting links varied. It will be understood that while the tool is in operation, the wheel lies upon the floor. In pushing off a tire casing, the wheel is laid down so that the permanent flange 11 is on the upper side, and the tool stands in an upright position. As the tire casing is pushed off the rim, the tool is slid around so that the removal of the tire casing is progressive. The upstanding end of the puller-bar 5 is in convenient position to be grasped by the left hand of the operator, to thereby enable him to steady the tool while he works the lever 9 with his right hand. The engagement of the tool with the permanent outwardly-turned flange 11 is an interlocking one in that the tool cannot be detached therefrom without tilting the upper end of the bars 5 and 6 toward the center of the wheel; this interlocking of the tool with the permanent flange 11 renders it easy for the operator to hold the tool in place and to slide it around the rim as the tire casing is progressively pushed off. In the operation of pushing the tire casing onto the rim, the permanent flange side of the wheel is next to the floor, and the hook shape of the member 16 ensures a proper engagement with the permanent rim-flange 11 during the operation. During this pushing-on operation, the upstanding end of the push-bar 6 is grasped by the hand of the operator to steady the tool and assist in properly positioning the tire-engaging end 17 of the bar.

While I have illustrated and described one particular embodiment of my invention, it will be understood that I do not wish to be limited to the exact construction shown and described, but that various changes and modifications may be made without departing from the spirit and intent of my invention.

What I claim as my invention is:

1. In a tire tool, an arm provided with an end portion adapted to engage a rim flange, a second arm provided with a tire-engaging end portion constructed to engage the bead of the tire inside of the outer edge of the flange of the rim, a link pivotally connected to each of said arms, an operating member pivotally connected at one end to said second arm and pivotally connected at an intermediate point to said first-mentioned arm, whereby operation of said member causes said second arm to press against the tire to force the same transversely of the rim, the connections between the arms serving to maintain them parallel at all times.

2. In a tire tool, an arm having a downwardly curved end portion adapted to be inserted between a rim flange and a tire casing and to grip said rim flange, a second arm provided with a tire-engaging end portion constructed to engage the bead of the tire inside of the outer edge of the flange of the rim, a link connecting said arms and pivotally connected thereto, an intermediate operating member pivotally connected at one end thereof to said second arm and pivotally connected at an intermediate point to said first arm, whereby operation of said operating member causes said engaging end of said second arm to be forced against the tire at a point adjacent to the rim to force said tire from the rim, the connections between the arms serving to maintain them parallel at all times.

3. In a tire tool, an arm having one end thereof curved downward and adapted to be inserted between a rim flange and tire casing, and the other end thereof provided with a hooked end portion adapted to hook over a rim flange when said arm is projected beneath the rim from the opposite side thereof, a second arm mounted substantially parallel to said first-mentioned arm and provided with tire-engaging end portions, a link connecting said arms, and an operating member pivotally connected at one end thereof to one of said arms and at an intermediate point to the other of said arms.

4. In a tire tool, an arm provided with a rim flange engaging members at its opposite ends, a second arm provided with tire-engaging members at its opposite ends, a link connecting said arms and pivotally connected thereto, and an operating member pivotally connected at one end thereof to said second arm at an intermediate point to said first arm, whereby through operation of said member said second arm can be forced against a tire either to force the same off of a rim on which it is mounted or to force the same on to a rim.

5. In a tire tool, a pull-arm having at one end hooks for maintaining a sliding interlocking connection with the permanent flange of the tire, a push-arm having a tire-engaging push-end, a link pivotally connecting said two arms, and an operating lever likewise pivotally connecting said two arms, the link and the connecting part of the operating lever lying parallel and the two arms likewise being maintained in parallelism at all times.

6. In a tire tool, a puller-arm provided at one end with hooks for maintaining sliding interlocking connection with the permanent rim of the wheel and at its other end with a hook, a pusher-arm having both its ends adapted to engage the tire casing in pushing relation, a link pivotally connecting the pusher-arm to the puller-arm, and an operating lever lying parallel to the aforesaid link and likewise pivotally connecting the puller-arm to the pusher-arm, for the purpose herein set forth.

Signed by me at Warsaw, Indiana, this 6th day of July, 1921.

FRANK R. HARTSOCK.